United States Patent Office 3,541,092
Patented Nov. 17, 1970

3,541,092
SUBSTITUTED PHENYL BENZOXAZINE
DIONE COMPOUNDS
John Krenzer, Oak Park, Ill., assignor to Velsicol Chemical Corporation, Chicago, Ill., a corporation of Delaware
No Drawing. Filed Nov. 17, 1967, Ser. No. 683,835
Int. Cl. C07d 87/04
U.S. Cl. 260—244         7 Claims

ABSTRACT OF THE DISCLOSURE

A compound of the formula:

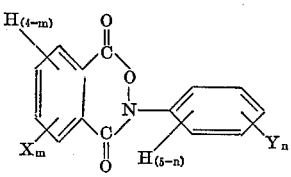

wherein each X and Y is selected from the group consisting of hydrogen, halogen, alkyl, alkenyl, haloalkyl, alkoxy, nitro, and dialkylamino; $m$ is an integer from 0 to 4; and $n$ is an integer from 0 to 5. A fungicidal composition comprising an inert carrier and, as an essential active ingredient, in a quantity toxic to fungi, a compound described above. A method for the control of fungi which comprises applying to said fungi a fungicidal composition comprising an inert carrier and, as an essential active ingredient, in a quantity toxic to fungi, a compound heretofore described.

---

This invention relates to new compositions of matter, in particular, the invention relates to new compounds of the formula:

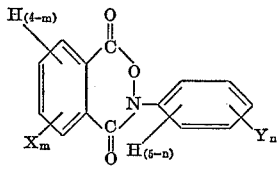

wherein each X and Y is selected from the group consisting of hydrogen, halogen, alkyl, alkenyl, haloalkyl, alkoxy, nitro and dialkylamino; $m$ is an integer from 0 to 4; and $n$ is an integer from 0 to 5. In a preferred embodiment of this invention each X and Y is independently selected from the group consisting of hydrogen, chlorine, bromine, lower alkyl, lower alkenyl, lower chloroalkyl, lower alkoxy, nitro and di-(lower alkyl)-amino; $m$ is an integer from 0 to 3; and $n$ is an integer from 0 to 3.

The compounds of this invention are useful as pesticides, and particularly as fungicides.

The new compounds of the present invention can be readily prepared by reacting a phthaloyl chloride of the formula:

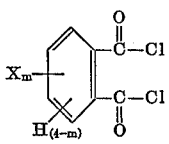

wherein X and $m$ are as heretofore described, with a hydroxylamine of the formula:

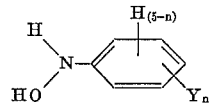

wherein Y and $n$ are as heretofore described, in the presence of a base such as a tertiary amine. This reaction can be carried out in a suitable organic solvent such as diethyl ether, by slowly adding a solution of the hydroxylamine and the base to a solution of the phthaloyl chloride at room temperature, with continuous stirring. The desired product can then be recovered from the reaction mixture by methods common to the art such as filtration, extraction, decantation, washing, drying, recrystallizing and the like.

Exemplary phthaloyl chlorides suitable as starting materials for preparing the compounds of this invention are 3-chlorophthaloyl chloride, 4-chlorophthaloyl chloride, 3,4-dichlorophthaloyl chloride, 4-bromophthaloyl chloride, 3-methylphthaloyl chloride, 4-nitrophthaloyl chloride, 4-dimethylaminophthaloyl chloride, 3-methyl-4-chlorophthaloyl chloride, 4-allylphthaoyl chloride, 3-trichloromethylphthaloyl chloride, 4 - methoxyphthaloyl chloride and the like.

Exemplary hydroxylamines suitable as starting materials for preparing the new compounds of this invention are phenyl hydroxylamine, 4-chlorophenyl hydroxylamine, 3,4-dichlorophenyl hydroxylamine, 4-bromophenyl hydroxylamine, 2-methylphenyl hydroxylamine, 2,4-dimethylphenyl hydroxylamine, 3-allylphenyl hydroxylamine, 2-nitrophenyl hydroxylamine, 4-methoxyphenyl hydroxylamine, 3-trichlorophenyl hydroxylamine, 4-dimethylaminophenyl hydroxylamine, 3-chloro-4-methylphenyl hydroxylamine, 2-dimethylamino-5-chlorophenyl hydroxylamine and the like.

The manner in which the compounds of this invention can be prepared readily is illustrated in the following examples.

EXAMPLE 1

Preparation of 3-(4'-chlorophenyl)-1H-2,3-benzoxazine-1,4(3H)-dione

A solution of N-(4-chlorophenyl) hydroxylamine (14.4 grams; 0.1 mol) and triethylamine (23 grams; 32 ml.) in diethyl ether (200 ml.) was slowly added with stirring, to a solution of phthaloyl chloride (20.3 grams; 0.1 mol) in diethyl ether (500 ml.). Stirring was continued for about ½ hour during which time a precipitate was formed. The precipitate was removed from the reaction mixture by filtration, and was suspended in water. The precipitate was then recovered by filtration and was dried. The dried precipitate was recrystallized from isopropyl alcohol to yield 3 - (4' - chlorophenyl) - 1H - 2,3 - benzoxazine-1,4(3H)-dione as a white fluffy solid having a melting point of 154° to 155° C. and having the following elemental analysis.

Analysis.—Theoretical for $C_{14}H_8ClNO_3$ (percent): C, 61.49; H, 2.94; Cl, 12.97; N, 5.12. Found (percent): C, 61.25; H, 2.12; Cl, 12.80; N, 5.13.

EXAMPLE 2

Preparation of 3-(4'-methylphenyl)-5,6-dichloro-1H-2,3-benzoxazine-1,4(3H)-dione A solution of N-(4-methylphenyl) hydroxylamine (12.3 grams; 0.1 mol) and triethylamine (23 grams; 32 ml.) in diethyl ether (200 ml.) is slowly added, with stirring, to a solution of 3,4-dichlorophthaloyl chloride (27.4 grams; 0.1 mol) in diethyl ether (500 ml.). Stirring is continued for a period of about 1 hour, during which time a precipitate is formed. The precipitate is removed from the reaction mixture by filtration, is washed and dried. The dried precipitate is recrystallized to yield 3-(4' - methylphenyl) - 5,6 - dichloro - 1H - 2,3 - benzoxazine-1,4(3H)-dione.

EXAMPLE 3

Preparation of 3-(3'-dimethylaminophenyl)-6-nitro-1H-2,3-benzoxazine-1,4(3H)-dione A solution of 3-dimethylaminophenyl hydroxylamine (15.2 grams; 0.1 mol) and triethylamine (23 grams; 32 ml.) in diethyl ether (200 ml.) is slowly added, with stirring, to a solution of 4-nitrophthaloyl chloride (24.9 grams; 0.1 mol) in diethyl ether (500 ml.). Stirring is continued for a period of about 1 hour, during which time a precipitate is formed. The precipitate is removed from the reaction mixture by filtration, is washed and dried. The dried precipitate is recrystallized to yield 3-(3'-dimethylaminophenyl) - 6 - nitro - 1H - 2,3 - benzoxazine-1,4(3H)-dione.

EXAMPLE 4

Preparation of 3-(2'-methyl-4'-chlorophenyl)-6-methoxy-1H-2,3-benzoxazine-1,4(3H)-dione A solution of 2-methyl-4-chlorophenyl hydroxylamine (15.3 grams; 0.1 mol) and triethylamine (23 grams; 32 ml.) in diethyl ether (200 ml.) is slowly added, with stirring, to a solution of 4-methoxyphthaloyl chloride (23.4 grams; 0.1 mol) in diethyl ether (500 ml.). Stirring is continued for a period of about 1 hour, during which time a precipitate is formed. The precipitate is removed from the reaction mixture by filtration, is washed and dried. The dried precipitate is recrystallized to yield 3-(2' - methyl - 4' - chlorophenyl) - 6 - methoxy - 1H - 2,3-benzoxazine-1,4(3H)-dione.

Other compounds within the scope of this invention can be prepared by the procedures described in the foregoing examples. Presented in the following examples are the essential ingredients required to prepare the indicated named compound according to the procedures heretofore described.

EXAMPLE 5

Phthaloyl chloride+2-trichloromethylphenyl hydroxylamine+triethylamine=3 - (2' - trichloromethylphenyl)-1H-2,3-benzoxazine-1,4(3H)-dione.

EXAMPLE 6

Phthaloyl chloride+phenyl hydroxylamine+triethylamine=3-phenyl-1H-2,3-benzoxazine-1,4(3H)-dione.

EXAMPLE 7

Phthaloyl chloride+3,5 - dichlorophenyl hydroxylamine+triethylamine=3 - (3',5' - dichlorophenyl) - 1H-2,3-benzoxazine-1,4(3H)-dione.

EXAMPLE 8

3,4 - Dichlorophthaloyl chloride+4 - methylphenyl hydroxylamine+triethylamine=3 - (4' - methylphenyl)-5,6-dichloro-1H-2,3-benzoxazine-1,4(3H)-dione.

EXAMPLE 9

Phthaloyl chloride+3 - allylphenyl hydroxylamine+triethylamine=3 - (3' - allylphenyl) - 1H - 2,3 - benzoxazine-1,4(3H)-dione.

Additional compounds within the scope of this invention which can be prepared in a manner similar to that detailed in the foregoing examples but which are not to be construed as limiting this invention are:

3-(3',4',5'-trichlorophenyl)-1H-2,3-benzoxazine-1,4,(3H)-dione,
3-(2'-ethyl-5'-chlorophenyl)-1,H-2,3-benzoxazine-1,4(3H)-dione,
3-(2',6'-dimethoxy-3',4'-dichlorophenyl)-1H-2,3-benzoxazine-1,4(3H)-dione,
3-(4'-propylphenyl)-1H-2,3-benzoxazine-1,4(3H)-dione,
3-phenyl-6,7-dichloro-1H-2,3-benzoxazine-1,4(3H)-dione,
3-(4'-chlorophenyl)-5-methyl-6-chloro-1H-2,3-benzoxazine-1,4(3H)-dione,
3-(3'-bromophenyl)-6-dimethylamino-1H-2,3-benzoxazine-1,4(3H)-dione,
3-(2'-methyl-3',5'-dichlorophenyl)-1H-2,3-benzoxazine-1,3(3H)-dione,
3-phenyl-7-trichloromethyl-1H-2,3-benzoxazine-1,4(3H)-dione,
3-(4'-nitrophenyl)-1H-2,3-benzoxazine-1,4(3H)-dione
and the like.

The new compounds of this invention are fungicidal in their ability to kill, inhibit, or inactivate a fungus so that it does not grow. Practically, these compounds can be used to prevent fungi and molds from harming cloth, wood, plants, seeds, fruit, animals, or whatever else they attack. The fungicidal compound should preferably be applied before the infection has occurred and certainly before it has progressed very far.

For practical use as fungicides, the compounds of this invention are generally incorporated into fungicidal compositions which comprise an inert carrier and a fungicidally toxic amount of such a compound. Such fungicidal compositions, which are usually known in the art as formulations, enable the active compound to be applied conveniently to the site of the fungus infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases, the active compounds are sufficiently soluble in common organic solvents such as kerosene or xylene so that they can be used directly as solutions in these solvents. Frequently, solutions of fungicides can be dispersed under superatmospheric pressure as aerosols. However, preferred liquid fungicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the fungus infestation. The emulsifiers most commonly used in these concentrates are nonionic or mixtures of nonionic with anionic surface-active agents.

A typical fungicidal composition according to this invention is illustrated by the following example, in which the quantities are in parts by weight.

EXAMPLE 10

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the fungus infestation.

The fungicides of this invention can be applied in any manner recognized by the art. The concentration of the new compounds of this invention in the fungicidal compositions will vary greatly with the type of formulation and the purpose for which it is designed, but generally the fungicidal compositions will comprise from about 0.05 to about 95 percent by weight of the active compounds of this invention. In a preferred embodiment of this invention, the fungicidal compositions will comprise from about 5 to about 75 percent by weight of the active compound. The compositions can also comprise such additional substances as other pesticides, spreaders, adhesives, stickers, fertilizers, activators, synergists, and the like.

The compounds of the present invention are also useful when combined with other fungicides in the fungicidal compositions heretofore described. The other fungicides can comprise from about 5% to about 95% of the active ingredients in the fungicidal compositions. Use of combinations of these other fungicides with the compounds of the present invention provides fungicidal compositions which are more effective in controlling fungi and often provide results unattainable with separate compositions of the individual fungicides. The other fungicides, with which the compounds of this invention can be used in the fungicidal compositions to control fungi, can include fungicides such as 2-amino-butane, bordeaux mixture, ammonium dimethyl dithiocarbamate, benzoyl trimethyl ammonium bromide, cadmium sulfate, captan, chloranil, copper sulfate, cycloheximide, dichlone, 2,4-dichloro-6-(2-chloroanilino)-s-triazine, DDT, dichloran, p-dimethylaminobenzenediazo sodium sulfonate, dinocap, diphenylmercuri 8-hydroxyquinolinate, dodine, ethylmercuric chloride, ferbam, folpet, gliodin, maneb, metham, mezineb, nabam, pentachloronitrobenzene, PMA, phenylmercuric urea, streptomicin, thiram, zineb, ziram, difolatan, PCNB, and the like.

Such fungicides can also be used in the methods and compositions of this invention in the form of their esters, amides, and other derivatives whenever applicable to the particular parent compounds.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf rust on wheat (*Puccinia rubigo-vera*), and such common soil fungi as fusarium wilt (*Fusarium oxysporum*), the seed rot fungus (*Phythium debaranum*), and the sheath and culm blight (*Rhizoctonia solani*). The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardy species of fungus.

The fungicidal activity of the compounds of this invention was demonstrated in experiments carried out for the protection against cucumber anthracnose. In these experiments the test compound was formulated by dissolving the compound in acetone and dispersing the acetone solution in distilled water containing small amounts of emulsifiers. Ten to twelve day old cucumber plants were then sprayed with the test formulation at various concentrations. After the spray film had dried the cucumber plants were inoculated with a spore suspension prepared from a 10 to 14 day old culture of *Colletotrichum lagenarium*. The plants were then placed in a greenhouse where they were supplied with daily or more frequent watering. After 7 to 10 days, the infection loci on the plants were counted and compared to untreated controls. In these experiments the compound 3-(4'-chlorophenyl)-1H-2,3-benzooxazine-1,4(3H)-dione gave 94.0% control at 1000 p.p.m. and 90.0% control at 400 p.p.m. as a protectant against cucumber anthracnose.

I claim:

1. A compound of the formula:

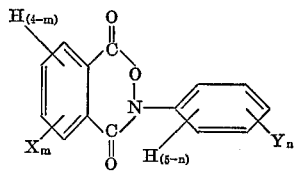

wherein each X and Y is selected from the group consisting of hydrogen, halogen, lower alkyl, lower alkenyl, halolower alkyl, lower alkoxy, nitro, amino, lower alkylamino and diloweralkylamino; $m$ is an integer from 0 to 4; and $n$ is an integer from 0 to 5.

2. The compound of claim 1, 3-(4'-chlorophenyl)-1H-2,3-benzoxazine-1,4(3H)-dione.

3. The compound of claim 1, 3-(4'-methylphenyl)-5,6-dichloro-1H-2,3-benzoxazine-1,4(3H)-dione.

4. The compound of claim 1, 3-(3'-dimethylaminophenyl)-6-nitro-1H-2,3-benzoxazine-1,4(3H)-dione.

5. The compound of claim 1, 3-(2'-methyl-4'-chlorophenyl)-6-methoxy-1H-2,3-benzoxazine-1,4(3H)-dione.

6. The compound of claim 1, 3-phenyl-1H-2,3-benzoxazine-1,4(3H)-dione.

7. The compound of claim 1, 3-(3,5-dichlorophenyl)-1H-2,3-benzoxazine-1,4(3H)-dione.

References Cited

Ryer et al.: Jour. Amer. Chem. Soc., vol. 73, pages 5675-8 (1951).

NATALIE TROUSOF, Primary Examiner

U.S. Cl. X.R.

424—248